US008422543B2

(12) United States Patent
Nguyen et al.

(10) Patent No.: US 8,422,543 B2
(45) Date of Patent: Apr. 16, 2013

(54) APPARATUS, SYSTEMS AND METHODS OF SIGNAL COMPENSATION FOR DIFFERENT SIGNALS COMMUNICATED OVER A COAXIAL CABLE SYSTEM

(75) Inventors: Phuc Nguyen, Highlands Ranch, CO (US); Pujitha Davuluri, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 412 days.

(21) Appl. No.: 12/790,725

(22) Filed: May 28, 2010

(65) Prior Publication Data

US 2011/0292989 A1 Dec. 1, 2011

(51) Int. Cl.
   *H03H 7/30* (2006.01)
(52) U.S. Cl.
   USPC .......................................................... 375/229
(58) Field of Classification Search .................. 375/229, 375/230, 231, 232
   See application file for complete search history.

(56) References Cited

U.S. PATENT DOCUMENTS

| 2004/0081146 A1* | 4/2004 | Tang et al. ..................... 370/370 |
| 2006/0072677 A1* | 4/2006 | Kwak et al. .................... 375/260 |
| 2007/0280116 A1* | 12/2007 | Wang et al. ..................... 370/236 |
| 2008/0158034 A1* | 7/2008 | Clark et al. ..................... 341/155 |
| 2008/0165875 A1* | 7/2008 | Mundarath et al. ............. 375/262 |
| 2009/0176467 A1* | 7/2009 | Im et al. ...................... 455/182.1 |
| 2009/0291660 A1* | 11/2009 | Trachewsky ................... 455/296 |

* cited by examiner

*Primary Examiner* — Jaison Joseph
(74) *Attorney, Agent, or Firm* — Lowe Graham Jones PLLC

(57) ABSTRACT

Communication signal compensation systems and methods are operable to compensate communication signals communicated to media devices using an agile equalizer over a coaxial cable communication system. An exemplary embodiment receives a first compensation control signal from a first media device, compensates a received first communication signal based upon the first compensation control signal, communicates the first compensated communication signal to the first media device over the first coaxial cable; receives a second compensation control signal from a second media device, compensates a received second communication signal based upon the second compensation control signal, and communicates the second compensated communication signal to the second media device over the second coaxial cable. The first compensation control signal defines compensation for communication signals communicated over a first coaxial cable. The second compensation control signal defines compensation for communication signals communicated to the second media device over a second coaxial cable.

19 Claims, 4 Drawing Sheets

APPARATUS, SYSTEMS AND METHODS OF SIGNAL COMPENSATION FOR DIFFERENT SIGNALS COMMUNICATED OVER A COAXIAL CABLE SYSTEM

BACKGROUND

Media devices, such as a set top box, a stereo, a television, a computer system, a game system, a security system, an automation controlled system, a metering system, a remote controlled system, a transceiver system, or the like, receive media from one or more signal sources. In many situations, a relatively long coaxial cable connects the media device to the signal source. Such relatively long coaxial cables are lossy, resulting in a degradation of signal quality.

Signal equalizers have been used to compensate the communicated signals to improve the signal quality. However, media systems have become increasingly more complex. For example, different types of media devices may receive different types of signals over the relatively long coaxial cable. Accordingly, there is a need in the arts to provide signal compensation for a variety of different signal types that share the same lossy coaxial cable connection.

Further, one or more of the multiple media devices may be communicatively coupled to to the signal source over its own long lossy coaxial cables such that signal compensation would be desirable for signals communicated to that particular media device. Concurrently, a different media device may be communicatively coupled to its own coaxial cable connection such that different signal compensation would be desirable for that particular media device. Accordingly, there is a need in the arts to provide signal compensation for a variety of media devices that receive media signals over a shared coaxial cable communication network.

SUMMARY

Systems and methods of communication signal compensation are disclosed. An exemplary embodiment receives a first compensation control signal from a first media device, compensates a received first communication signal based upon the first compensation control signal, communicates the first compensated communication signal to the first media device over the first coaxial cable, receives a second compensation control signal from a second media device, compensates a received second communication signal based upon the second compensation control signal, and communicates the second compensated communication signal to the second media device over the second coaxial cable. The first compensation control signal defines compensation for communication signals communicated over a first coaxial cable. The second compensation control signal defines compensation for communication signals communicated to the second media device over a second coaxial cable.

BRIEF DESCRIPTION OF THE DRAWINGS

Preferred and alternative embodiments are described in detail below with reference to the following drawings.

DETAILED DESCRIPTION

Figure 1:
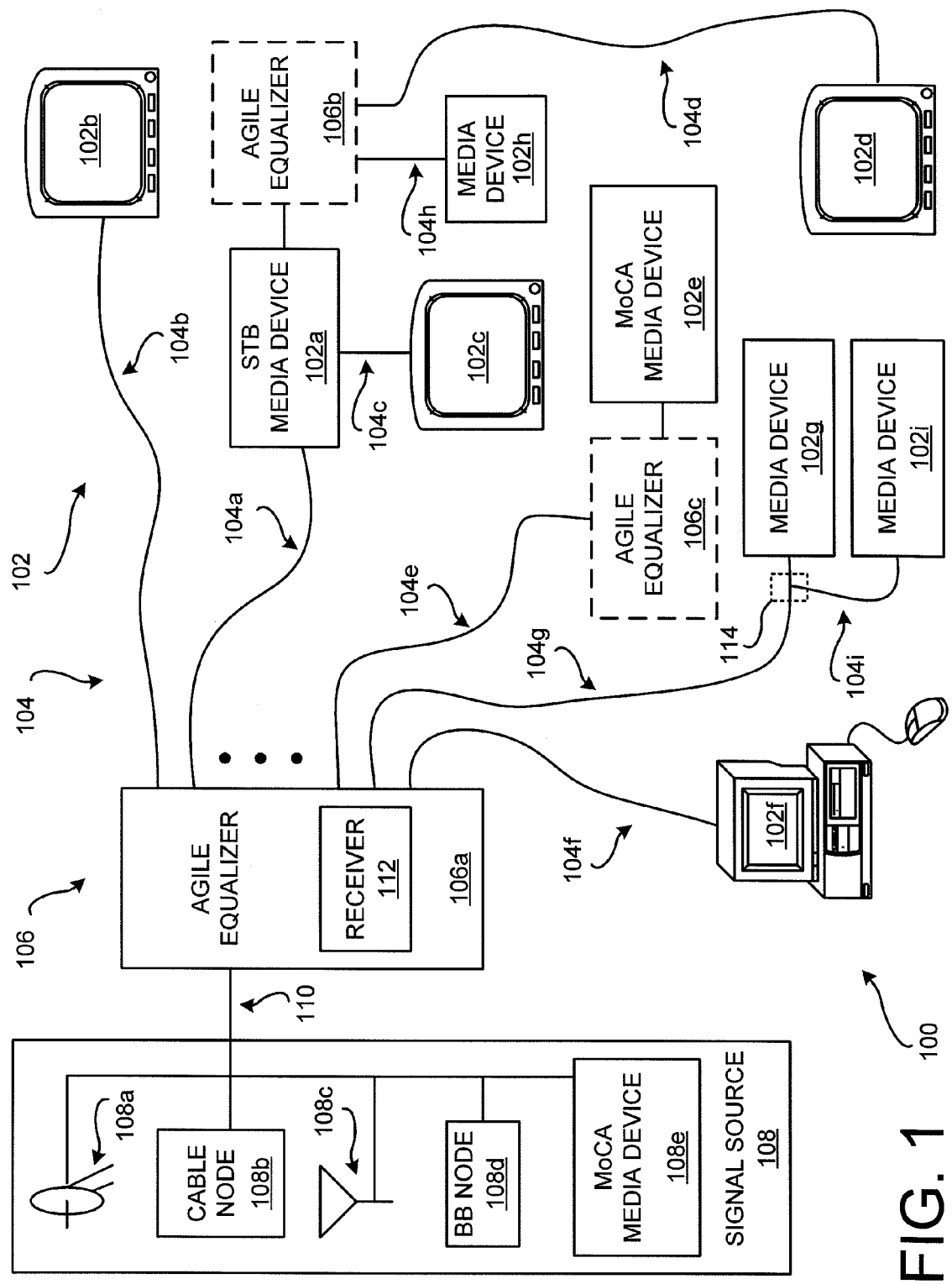
FIG. 1 is a block diagram of an embodiment of an agile equalizer system communicatively coupled to a plurality of media devices using a coaxial cable communication network.

FIG. 1 is a block diagram of an embodiment of an agile equalizer system 100 communicatively coupled to a plurality of media devices 102 using a coaxial cable communication network 104. One or more of the coaxial cables of the coaxial cable communication network 104 are relatively long coaxial cables that are lossy, resulting in a degradation of signal quality for signals communicated over that particular lossy coaxial cable.

In this exemplary embodiment, the plurality of media devices 102 may be different types of media devices that receive different types of communicated signals over the coaxial cable communication network 104. Further, the lengths of the individual coaxial cables of the coaxial cable communication network 104 may vary. Accordingly, signal attenuation over a particular one of the coaxial cables of the exemplary coaxial cable communication network 104 is likely to be different from other coaxial cables since the length of the various coaxial cables vary, and since different signal types are being communicated over the coaxial cables. For example, an ultra high frequency (UHF) signal will have a different level of attenuation than a very high frequency (VHF) signal received by a media device 102b, here illustrated as a television, over its coaxial cable 104b. Signal attenuation is different because of the different lengths of the coaxial cables 104a, 104b, and because of the different signal characteristics.

To facilitate disclosure of an embodiment of the agile equalizer system 100, the coaxial cable communication network 104 is shared by a plurality of different electronic media devices 102. In some applications, the coaxial cable communication network 104 may be a single coaxial cable that communicatively couples the agile equalizer system 100 with a single media device 102. Similarly, the coaxial cable communication network 104 may be a single coaxial cable that communicatively couples the agile equalizer system 100 with a plurality of media devices 102.

Embodiments of the agile equalizer system 100 employ one or more agile equalizers 106 that are configured to communicate a plurality of test signals to the various media devices 102. In exemplary embodiments, the media devices 102 analyze one or more of the received test signals that are associated with the type of communication signal that particular one of the media devices 102 communicate over the coaxial cable communication network 104. Based on the relevant analyzed test signal(s), each of the media devices 102 determine a particular level and/or type of signal compensation that is suitable for communication signals that it receives over the coaxial cable communication network 104.

In an exemplary embodiment, the media devices 102 communicate a unique compensation control signal to the agile equalizer 106 that specifies a particular level and/or a particular type of signal compensation that is to be provided by that agile equalizer 106. In some embodiments, the compensation control signal may be communicated to the agile equalizer 106 at a predefined amount of time prior to when the media device 102 starts communication over their particular coaxial cable of the coaxial cable communication network 104. The predefined amount of time may be a relatively short period of time sufficient to allow the agile equalizer 106 to configure and/or actuate an equalizer stage that compensates the communication signal. In other embodiments, the compensation control signal may be provided to the agile equalizer 106 and saved for later use when the media device 102 is in communication.

In the various embodiments, when a particular one of the media devices 102 communicates over the coaxial cable communication network 104, the communicating media device 102 receives a compensated communication signal from the agile equalizer 106 that has been uniquely compensated based upon the characteristics of the coaxial cable that it is coupled to. Further, the compensated communication signal may be uniquely compensated based upon the characteristics of the communication signal.

When the media device 102 concludes communications over the coaxial cable communication network 104, the agile equalizer 106 may cease the signal compensation for that particular media device 102. When a different one of the plurality of media devices 102 begins communicating over the coaxial cable communication network 104, then the agile equalizer system 100 changes the signal compensation to provide a unique compensated communication signal that is suitable for that particular media device 102. That is, the agile equalizer system 100 is configured to dynamically provide unique compensation to the communication signals received by each of the media devices 102 when that particular media device 102 is communicating over the coaxial cable communication network 104.

Alternatively, the agile equalizer may continue compensation for a particular one or more of the media devices 102 after communications conclude. Accordingly, when communications resume, signal compensation is immediately available.

In some applications, similar or identical media devices 102 may be receiving the same type of communication signals. However, the particular level of compensation may not be suitable for both of the media devices 102. For example, a television may be coupled relatively close to the agile equalizer 106 while another television may be coupled a relatively long distance away from the agile equalizer 106. Thus, compensation for one television may not be suitable for the same type of signal received by the other television. In an exemplary embodiment, a hybrid compensation level may be determined that is suitable for the media devices. For example, but not limited to, an average compensation level may be determined so that the signals are acceptable for both of the televisions.

Alternatively, or additionally, some embodiments may provide multiple output connectors so that the coaxial cables to particular media devices 102 may be uniquely coupled to the agile equalizer 106. In the above example with two televisions, the first television may receive a first compensated signal directly from the agile equalizer 106, and the second televisions may receive a second compensated signal directly from the agile equalizer 106.

The media devices 102 may be any type of an electronic media device that is configured to receive a communication signal over a coaxial cable. Non-limiting examples of media devices 102 include the STB media device 102*a* (which communicates over the coaxial cable 104*a*), the television 102*b* (which communicates over the coaxial cable 104*b*), a television 102*c* (which communicates over a coaxial cable 104*c*), a television 102*d* (which communicates over a coaxial cable 104*d*), a Multimedia over Coax-Alliance (MoCA) media device 102*e* (which communicates over a coaxial cable 104*e*), a computer system 102*f* (which communicates over a coaxial cable 104*f*), a generic media device 102*g* (which communicates over a coaxial cable 104*g*), and a generic media device 102*h* (which communicates over a coaxial cable 104*h*). Further, a single coaxial cable of the coaxial cable communication network 104 may support multiple media devices 102, such as the exemplary media device 102*i* that also communicates over the coaxial cable 104*g*. Non-limiting examples of the generic media devices 102*g*, 102*h*, and/or 102*i* include, but are not limited to, broadband telephones, stereos, radios, televisions (TVs), digital video disc (DVD) players, digital video recorders (DVRs), game playing devices, security systems, automation controlled systems, metering systems, remote controlled systems, transceiver systems, video cameras, personal computers (PCs), or other media devices that are configured to communicate over a coaxial cable.

Embodiments of the agile equalizer system 100 comprise one or more agile equalizers 106, such as the exemplary agile equalizer 106*a*. The agile equalizer 106*a* is configured to communicatively couple to one or more sources of communication signals, such as an exemplary signal source 108 illustrated in FIG. 1. In an exemplary embodiment, agile equalizer 106*a* is configured to couple to a coaxial cable 110 so that the agile equalizer 106*a* is located in relatively close proximity to the signal source 108. Accordingly, the coaxial cable 110 is a relatively short and lossless coaxial cable. In other embodiments or applications, a suitable connector may be used to communicatively couple the agile equalizer 106*a* and the signal source 108.

The signal source 108 may be configured to receive a communication signal from a plurality of different signal sources. Alternatively, or additionally, the agile equalizer 106 may be configured to couple to a variety of individual sources of communication signals. The various communication signals have different signal characteristics.

For example, the signal source 108 may be coupled to a satellite dish 108*a*. The satellite dish 108*a* is configured to receive media signals from one or more satellites. Thus, the STB media device 102*a* may be configured to receive a media signal from the satellite dish 108*a* over the coaxial cable 110.

As another example, the signal source 108 may be coupled to a cable node 108*b* that provides connectivity back to a cable head end system. Thus, a content service provider may provide media signals to the media devices 102. Alternatively, or additionally, the content service provider may support data signal communications between the media devices 102 and other remote devices or systems. For example, the STB media device 102*a* may be configured to receive a media signal from the cable node 108*b* over the coaxial cable communication network 104. Alternatively, or additionally, the cable node 108*b* could provide data services to other media devices 102, such as broadband telephones or computers.

As another example, the signal source 108 may be coupled to an antenna 108*c*. The antenna 108*c* is configured to receive over-the-air media signals from one or more broadcasting media content providers, such as radio stations or television stations. For example, the television 102*b* may be configured to receive a VHF or UHF media signal from the antenna 108*c* over the coaxial cable communication network 104

As another example, the signal source 108 may be coupled to a broadband (BB) node 108*d* that provides connectivity back to a telephony system. Thus, a telephone service provider may provide for communication of voice and/or data signals between the media devices 102 to other remote devices or systems.

As another example, the signal source 108 may be coupled to a broadband node 108*d* that provides connectivity back to the internet, a local area network, a wide area network, an ethernet, or other type of network. Thus, an Internet service provider may provide for communications of data signals to and from the various media devices 102 over the coaxial cable communication network 104.

As another example, the signal source 108 may be coupled to a MoCA media device 108e. Thus, the MoCA media device 102e and the MoCA media device 108e may communicate with each other under established MoCA standards over the coaxial cable communication network 104.

Alternative embodiments of the agile equalizer 106 may be configured to couple to other types of media sources in addition to, or alternatively to, the exemplary coaxial cable-based signal source 108. For example, the telephone broadband node 108d may be a component of the agile equalizer 106 that provides direct connectivity to the telephony system. In other embodiments, the agile equalizer 106 may include one or more suitable connectors that are configured to communicatively couple to a local area network, a wide area network, an ethernet, or other type of data network.

In the various embodiments, communication signals received from the signal source 108 are compensated based upon which particular one of the media devices 102 is receiving the communication signal. The media device 102 currently communicating over the coaxial cable communication network 104 is referred to as a destination media device 102. The compensated communication signal is communicated to the destination media device 102 such that, when the compensated communication signal is received at the destination media device 102, the signal quality of the received compensated communication signal satisfies at least acceptable design standards. That is, the destination media device 102 receives a compensated communication signal that has sufficient quality for the destination media device 102 to perform its intended function. Preferably, the received compensated communication signal exceeds the signal quality standards for the destination media device 102.

Embodiments of the agile equalizer 106 include at least one receiver 112 that is configured to receive a compensation control signal from the destination media device 102. The compensation control signal defines a particular level and/or a particular type of signal compensation. Thus, as a particular destination media device 102 is receiving compensated communication signals over the coaxial cable communication network 104, the agile equalizer 106 may configure itself to provide unique signal compensation for the communication signal that is currently being transmitted to the destination media device 102 based on the received compensation control signal.

To conceptually illustrate operation of an exemplary embodiment of the agile equalizer system 100, the exemplary STB media device 102a may be configured to receive media from a satellite system content provider. In this example, the STB media device 102a is configured to receive a satellite signal from the satellite antenna 108a using a suitable satellite signal, such as, but not limited to, an L-band signal format or a C-band signal format. When the STB media device 102a is in use, the STB media device 102a communicates its unique compensation control signal to the agile equalizer 106a. The compensation control signal specifies a particular level and/or type of signal compensation for the L-band media signal. The agile equalizer 106a then compensates the received L-band media signal, and communicates the compensated satellite signal over the coaxial cable 104a to the STB media device 102a.

In another exemplary application, the STB media device 102a may be configured to receive media from a cable system content provider. In this example, the STB media device 102a is configured to receive a digital media signal from the cable node 108b using a digital signal format. Further, the STB media device 102a may be configured to provide two-way voice, video and/or data services to other media devices 102. When the STB media device 102a is in use, the STB media device 102a communicates its unique compensation control signal to the agile equalizer 106a. The compensation control signal specifies a particular level and/or type of signal compensation for the particular type of signal that is being communicated to the STB media device 102a. The agile equalizer 106a then compensates the signal received from the cable node 108b, and communicates the compensated signal to the STB media device 102a over the coaxial cable 104a.

In the exemplary application illustrated in FIG. 1, the television 102c may be receiving a media signal from the STB media device 102a over the coaxial cable 104c, which is presumed to be a relatively short cable run with relatively low signal attenuation characteristics. Accordingly, the STB media device 102a provides an uncompensated media signal directly to the television 102c that is derived from the compensated media signal received by the STB media device 102a.

The STB media device 102a may be additionally providing media content to other remote media devices 102, such as the television 102d and/or the media device 102h, which are both presumed to be communicatively coupled to the STB media device 102a using relatively long coaxial cables 104d, 104h, respectively. In this example, the long coaxial cables 104d, 104h each have relatively high and unique signal attenuation characteristics. Accordingly, a second agile equalizer 106b is coupled to the output of the STB media device 102a. The STB media device 102a is now acting as a signal source to both the television 102d and the media device 102h. The second agile equalizer 106b is configured to compensate the communication signals received from the STB media device 102a, and then communicate a compensated media signal to the television 102d and/or the media device 102h.

In an exemplary embodiment, the television 102d and/or the media device 102h that is currently active as the destination media device specifies the particular level and/or the type of signal compensation to the second agile equalizer 106b by communicating a compensation control signal to the agile equalizer 106b. The particular level and/or the type of signal compensation may be determined based upon the one or more test signals from the second agile equalizer 106b that are transmitted to the television 102d and to the media device 102h.

In an alternative embodiment, the STB media device 102a determines which one of the television 102d and the media device 102h is the current destination media device. Accordingly, the STB media device 102a may provide the compensation control signal that specifies the particular level and/or type of signal compensation to the second agile equalizer 106b. The particular level and/or type of signal compensation provided by the second agile equalizer 106b may be determined by testing, by estimating based on a priori knowledge of the signal type characteristics and/or the attenuation characteristics of the coaxial cables 104d, 104h, or by another suitable method.

The exemplary television 102b is configured to receive media from one or more content providers that broadcast media signals over local airwaves. For example, the television 102b may be configured to receive a VHF and/or a UHF media signal from the antenna 108c. When the television 102b is in use, the television 102b communicates its unique compensation control signal to the agile equalizer 106a to specify a particular level and/or the type of signal compensation that is suitable for the VHF and/or the UHF media signal. The agile equalizer 106a then compensates the received VHF and/or the received UHF media signal, and communicates the compensated VHF and/or the compensated UHF media signal over the coaxial cable 104b to the television 102b.

The exemplary MoCA media device 102e is configured to exchange media and/or data with one or more other MoCA media devices, such as the exemplary MoCA media device 108e. When the MoCA media device 102e is receiving a media signal and/or a data signal from the MoCA media device 108e, the MoCA media device 102e communicates its unique compensation control signal to the agile equalizer 106a to specify the particular level and/or the type of signal compensation. The agile equalizer 106a then compensates the media signal and/or the data signal received from the MoCA media device 108e, and communicates the compensated MoCA media signal and/or data signal over the coaxial cable 104e to the MoCA media device 102e.

In some applications, a third agile equalizer 106c may be coupled to an output of the MoCA media device 102e. When the MoCA media device 102e is communicating a return media signal and/or a return data signal to the MoCA media device 108e, the MoCA media device 102e is now acting as a signal source. Accordingly, the agile equalizer 106c compensates the return media signal and/or the return data signal received from the MoCA media device 102e, and communicates a compensated return media signal and/or a compensated return data signal to the MoCA media device 108e.

The return media signal and/or the return data signal communicated to the MoCA media device 108e is likely to be substantially the same as the media signal and/or the data signal communicated to the MoCA media device 102e. Accordingly, the particular level and/or the type of signal compensation provided by the agile equalizer 106c may be the same, or substantially the same, as provided by the third agile equalizer 106c. Accordingly, in an alternative embodiment, the MoCA media device 102e may specify the particular level and/or the type of signal compensation to the third agile equalizer 106c when it is transmitting the return media signal and/or the return data signal to the MoCA media device 108e over the coaxial cable 104e.

The exemplary personal computer 102f is configured to communicate data signals with other devices (not shown) communicatively coupled to the signal source 108. For example, the personal computer 102f may be configured to access the Internet via the broadband communication (BC) node 108e. When the personal computer 102f is in use, the personal computer 102f communicates its unique compensation control signal to the agile equalizer 106a to specify a particular level and/or type of signal compensation for the data signal. The agile equalizer 106a then compensates the received data signal, and communicates the compensated data signal over the coaxial cable 104f to the personal computer 102f. An optional agile equalizer 106 (not shown) may be coupled to an output of the personal computer 102f to provide compensation to return data signals communicated from the personal computer 102f.

In some situations, multiple media devices 102 may share a common coaxial cable. For example, the two exemplary media devices 102g and 102i receive media and/or data signals from the agile equalizer 106a over the same coaxial cable 104g. For this example, the coaxial cable 104i is assumed to be a relatively short coaxial cable that does not have significant signal attenuation characteristics. In the exemplary application in FIG. 1, the coaxial cable 104i is optionally coupled to a cable splitter box 114.

When the media device 102g is in use, the media device 102g communicates its unique compensation control signal to the agile equalizer 106a to specify the particular level and/or the type of signal compensation for the particular type of media signal and/or data signal that it is using. The agile equalizer 106a then compensates the received media signal and/or data signal, and communicates the compensated media signal and/or data signal over the coaxial cable 104g to the media device 102g.

Similarly, when the media device 102i is in use, the media device 102i communicates its unique compensation control signal to the agile equalizer 106a to specify the particular level and/or the type of signal compensation for the particular type of media signal and/or data signal that it is using. The agile equalizer 106i then compensates the received media signal and/or data signal, and communicates the compensated media signal and/or data signal over the coaxial cable 104g to the media device 102i.

In some instances, the characteristics of the media signal and/or data signal used by the media device 102g is different from the characteristics of the media signal and/or data signal used by the media device 102i. Accordingly, the compensation control signal of the media device 102g will be different from the compensation control signal of the media device 102i.

Figure 2:
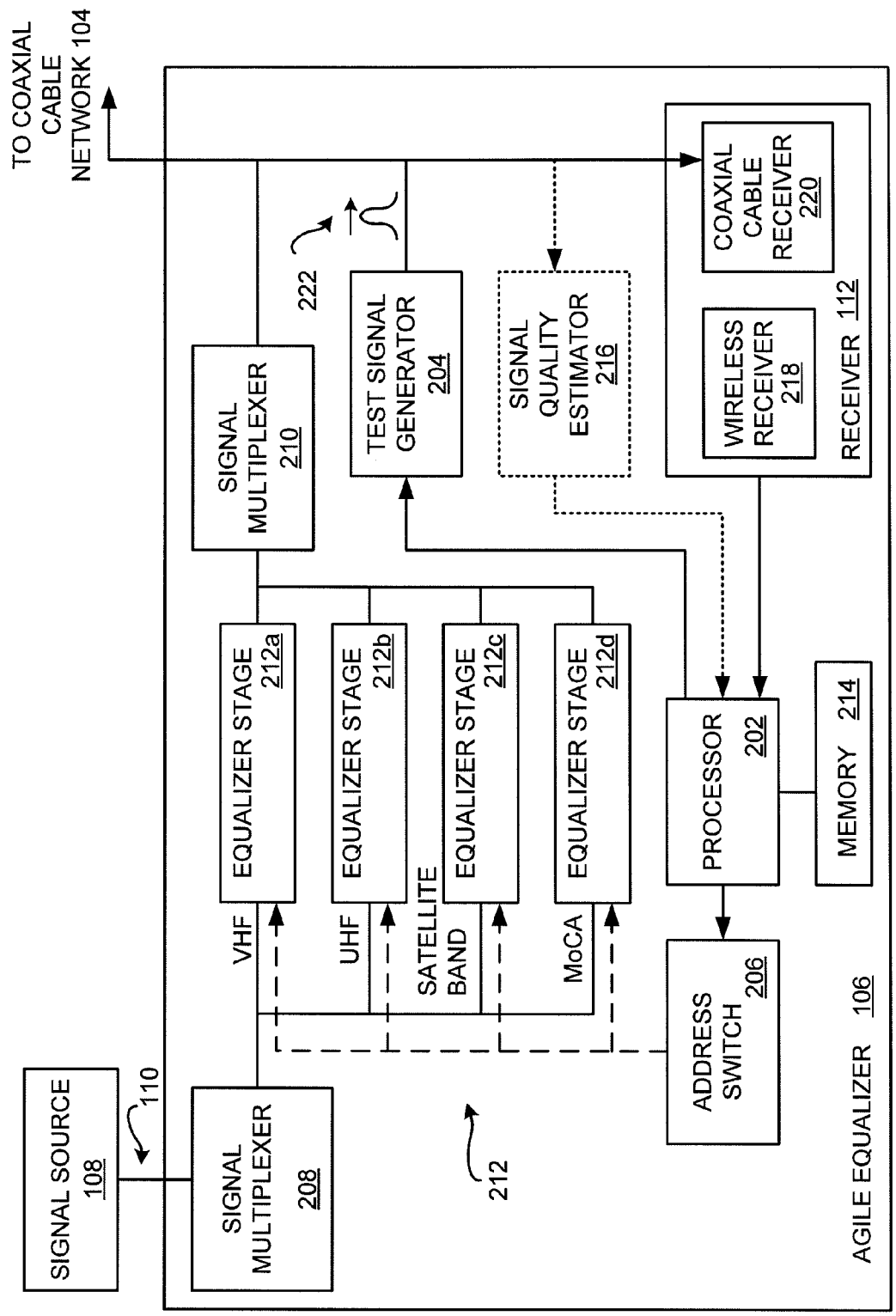
FIG. 2 is a block diagram of an exemplary agile equalizer.

FIG. 2 is a block diagram of an exemplary agile equalizer 106. The exemplary agile equalizer 106 comprises the receiver 112, a processor 202, a test signal generator 204, an address switch 206, an optional first signal multiplexer 208, an optional second signal multiplexer 210, a plurality of equalizer stages 212, and an optional memory 214. In some embodiments, an optional signal quality estimator 216 may be included. In a non-limiting embodiment, the signal quality estimator 216 is a processor system configured to determine signal quality based on the received signal strength and/or a signal to noise ratio (RSSI/SNR).

The receiver 112 includes a wireless receiver 218 and/or a coaxial cable receiver 220. The wireless receiver 218 is configured to receive a wireless compensation control signal from the current destination media device 102. The wireless compensation control signal may be communicated using any suitable wireless medium, such as, but not limited to, a radio frequency (RF) medium or an infrared medium. The coaxial cable receiver 220 is configured to receive a wire-based compensation control signal over the coaxial cable communication network 104 for the current destination media device 102. Some embodiments may include both the wireless receiver 218 and/or a coaxial cable receiver 220, may include multiple receivers 218 and/or 220, and/or may include other types of receivers.

The processor 202 determines compensation information based on compensation control signals received from the media devices 102. In some embodiments, the determined compensation information and/or the received compensation control signal may be saved in the memory 214 for later use.

The equalizer stages 212 are configured to compensate a particular type of communication signal. For example, the exemplary equalizer stage 212a is configured to compensate a VHF communication signal. The exemplary equalizer stage 212b is configured to compensate a UHF communication signal. The exemplary equalizer stage 212c is configured to compensate an L-band communication signal. The exemplary equalizer stage 212d is configured to compensate a MoCA communication signal. In alternative embodiments that are configured to receive other types of communication signals, a suitable equalizer stage 212 may be included for each of the other communication signal types. In embodiments that are not coupled to media devices 102 that use one of the VHF communication signal, the UHF communication signal, the L-band communication signal, or the MoCA communication signal, the embodiment may omit that corresponding one of the equalizer stages 212.

The processor 202 is configured to respond to a particular compensation control signal received from the current destination media device 102. The received compensation control signal communicated by the destination media device 102 is processed by the processor 202 to determine the compensation for the communication signal that is sent to that particular destination media device 102. The processor 202 is configured to generate a control signal based upon the determined compensation. The processor 202 then communicates the control signal to the address switch 206. The address switch 206 may then switch on/off, and/or provide setting information for, the various components of a selected one of the equalizer stages 212 that will be compensating the particular communication signal being communicated to the current destination media device 102.

For example, with respect to FIG. 1, the television 102b may be tuned to receive a UHF media signal over the coaxial cable 104b. In an exemplary embodiment, the television 102b communicates a UHF compensation control signal to the agile equalizer 106a. One of the receivers 218 and/or 220 in the agile equalizer 106a receives the UHF compensation control signal. The processor 202 determines the particular level and/or the type of UHF signal compensation based on the received compensation control signal. The processor 202 generates a control signal and communicates it to the address switch 206. The address switch 206 then switches on/off, and/or provides setting information for, the various components of the equalizer stage 112b that are configured to compensate UHF media signals. Accordingly, a compensated UHF media signal is communicated to the television 102b over the coaxial cable 104b.

The optional signal multiplexer 208 provides for multiple-signal connectivity between the signal source 108 and the various equalizer stages 212. The optional signal multiplexer 210 provides for multiple-signal connectivity between the various equalizer stages 212 and the coaxial cable communication network 104. In alternative embodiments, other connection means may be employed. When the signal multiplexers 208 and 210 are used in embodiments of an agile equalizer 106, a plurality of communicated media signals and/or data signals may be concurrently compensated by the various associated equalizer stages 212. Accordingly, multiple compensated communication signals may then be communicated to various destination media devices 102 over the coaxial cable communication network 104. For example, the television 102b may receive a compensated UHF media signal over the coaxial cable 104b, while the personal computer 102f concurrently receives a compensated data signal over the coaxial cable 104f.

The test signal generator 204 is configured to generate and communicate a plurality of test signals 222 that are received by the various media devices 102 that are coupled to the coaxial cable communication network 104. In an exemplary embodiment, the test signal generator 204 sweeps through a variety of different test signals 222 that correspond to the communication signals that may be used by the various media devices 102. Generating and communicating the test signals 222 may be performed during initialization of the agile equalizer system 100, may be performed periodically, may be performed when a new media device 102 is coupled to the coaxial cable communication network 104, may be performed when a new media device 102 is detected, may be performed at a specified time, may be performed by a person through manual or electronic activation, may be performed when a coaxial cable is added to the coaxial cable communication network 104, and/or may be performed in response to other suitable events.

An exemplary test signal generator 204 may be a multi-function signal generator that is configured to generate the plurality of test signals 222. A test signal 222 may be in the analog domain or the digital domain. For example, one or more test frequencies may be generated in a test signal 222. One or more digital pattern signals may be generated in a test signal 222. Test signals 222 are configured to enable a particular type of media device 102 to test and determine attenuation characteristics for communication signals that it will be receiving over the coaxial cable communication network 104.

For example, a UHF test signal and/or a VHF test signal 222 may be generated and communicated to a television. An L-band test signal 222 may be generated and communicated to a STB media device 102. A MoCA test signal 222 may be generated and communicated to a MoCA media device 102. Other test signals 222 may be generated and communicated to other types of media devices 102.

The test signals 222 may be communicated together, may be communicated serially, or may be communicated individually. For example, upon initialization of the agile equalizer system 100 and/or at a specified time, all available test signals 222 may be generated and communicated onto the coaxial cable communication network 104 for receipt by any media devices 102 that are currently active. Alternatively, or additionally, an individual test signal 222 may be generated and communicated to a particular one of the media devices 102.

The generated test signals 222 are output from the agile equalizer 106 onto the coaxial cable communication network 104. Upon receipt of a particular relevant test signal 222, each media device 102 may then determine its unique compensation control signal for communication signals corresponding to that particular test signal 222.

The optional received signal quality estimator 216 is configured to receive one or more test signals 222 from another agile equalizer 106 communicated over the coaxial cable communication network 104. The signal quality estimator 216 is configured to determine the particular level and/or the type of signal compensation that should be provided by the other agile equalizer 106 when it is communicating a communication signal to the receiving agile equalizer 106. With respect to FIG. 1, for example, the agile equalizer 106c may communicate a MoCA type test signal 222 to the agile equalizer 106a over the coaxial cable 104e. The agile equalizer 106a would then determine a compensation control signal defining the particular level and/or the type of signal compensation suitable for a MoCA communication signal communicated from the MoCA media device 102e. When the MoCA media device 102e is sending a communication signal over the coaxial cable 104e that is received by the agile equalizer 106a, the agile equalizer 106a (or alternatively, the MoCA media device 102e) can then provide the compensation control signal to the agile equalizer 106e.

In an alternative embodiment, the functionality of the signal quality estimator 216 may be implemented in the processor 202. For example, the coaxial cable receiver 220 may receive one or more of the test signals 222 over the coaxial cable communication network 104. Based on the test signals 222 provided by the coaxial cable receiver 220, the processor 202 would then determine the relevant compensation control signal. Alternatively, the functionality of processor 202 and the signal quality estimator 216 may be implemented in another multi-purpose processor.

When an active destination media device 102 concludes communications over the coaxial cable communication network 104, the agile equalizer 106 may cease the signal compensation for that particular media device 102. For example, the processor 202 may cause the address switch 206 to deactivate or otherwise bypass the particular equalizer stage 212 that was providing compensation for communication signals for that particular media device 102 that has ceased communication. In some embodiments, the media device 102 that has ceased communication notifies the agile equalizer 106. In other embodiments, the agile equalizer 106 monitors communication signals to determine that the media device 102 has concluded communications over the coaxial cable communication network 104.

Figure 3:
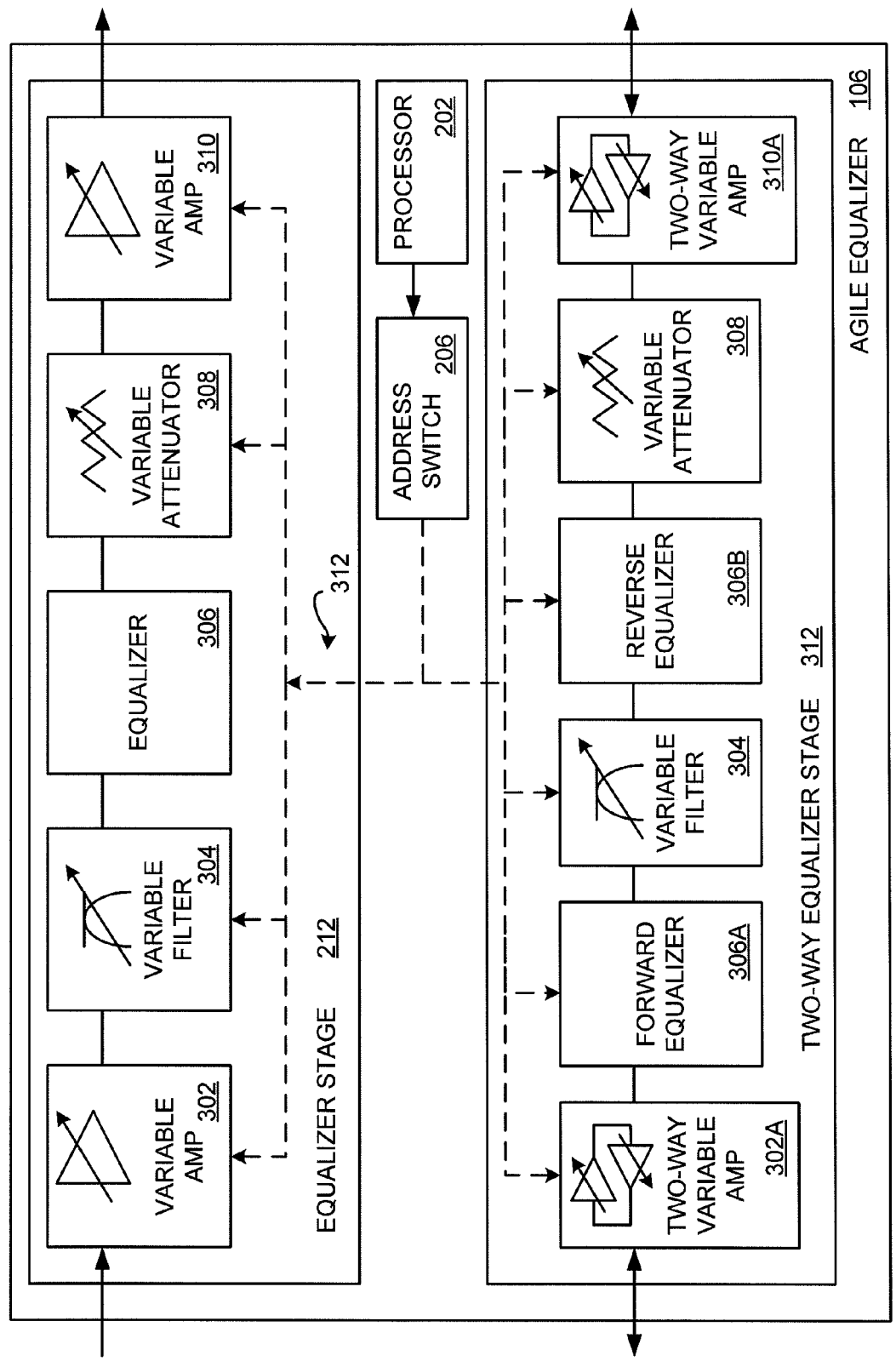
FIG. 3 is a block diagram of an exemplary equalizer stage.

FIG. 3 is a block diagram of an exemplary equalizer stage 212. The equalizer stage 212 includes a first variable amplifier (amp) 302, a variable filter 304, an equalizer 306, a variable attenuator 308, and a second variable amp 310. The address switch 206 is controllably coupled to the first variable amp 302, the variable filter 304, the equalizer 306, the variable attenuator 308, and the second variable amp 310 via a control connection 312, illustrated as a single connector in this exemplary embodiment. In other embodiments, one or more individual connectors may be used to controllably couple the address switch 202 to the first variable amp 302, the variable filter 304, the equalizer 306, the variable attenuator 308, and/or the second variable amp 310.

In an exemplary embodiment, the first variable amp 302 receives a communication signal from the signal multiplexer 208. The first variable amp 302, if actuated by the address switch 206, amplifies the communication signal. In an exemplary embodiment, the address switch 206 actuates the first variable amp 302 by communicating a control signal to the first variable amp 302 based on a control signal generated by the processor 202. Additionally, the address switch 206 may specify a level of amplification that is used by the first variable amp 302. In some embodiments, the level of amplification may be predefined and set during installation or initialization of the agile equalizer system 100. For example, a particular one of the equalizer stages 212 may be designated for compensation of a UHF media signal that is received from the antenna 108c. If characteristics of the received UHF media signal are known or determinable, and if a single level of amplification is desired for the received UHF media signal prior to other compensation, then the first variable amp 302 may be preset. In other embodiments, the level of amplification provided by the first variable amp 302 may be coordinated with amplification provided by the second variable amp 310 and/or may be set based upon the particular destination media device 102. In some embodiments, the first variable amp 302 may be omitted, may be bypassed, or otherwise not actuated. In some embodiments, a fixed amplifier may be used instead of the first variable amp 302.

In an exemplary embodiment, the variable filter 304 receives the communication signal from the first variable amp 302. The variable filter 304, if actuated by the address switch 206, filters the communication signal. In an exemplary embodiment, the address switch 206 actuates the variable filter 304 by communicating a control signal to the variable filter 304 based on a control signal generated by the processor 202. Additionally, the address switch 206 may specify a level of filtering that is used by the variable filter 304. In some embodiments, the level of filtering may be predefined and set during installation or initialization of the agile equalizer system 100. For example, a particular one of the equalizer stages 212 may be designated for compensation of a UHF media signal that is received from the antenna 108c. If characteristics of the received UHF media signal are known or determinable, and if a single level of filtration is desired for the received UHF media signal, then the variable filter 304 may be preset. In some embodiments, the variable filter 304 may be omitted, may be bypassed, or otherwise not actuated. In some embodiments, a fixed filter may be used instead of the variable filter 304.

In an exemplary embodiment, the equalizer 306 receives the communication signal from the variable filter 304. The equalizer 306, if actuated by the address switch 206, equalizes portions of the communication signal. In an exemplary embodiment, the address switch 206 actuates the equalizer 306 by communicating a control signal to the equalizer 306 based on a control signal generated by the processor 202. Additionally, the address switch 206 may specify different levels of equalization that are provided by the equalizer 306. In some embodiments, the level of equalization may be predefined and set during installation or initialization of the agile equalizer system 100. For example, a particular one of the equalizer stages 212 may be designated for compensation of a UHF media signal that is received from the antenna 108c. If characteristics of the received UHF media signal are known or determinable such that the levels of equalization are known, then the equalizer 306 may be preset. In some embodiments, the equalizer 306 may be omitted, may be bypassed, or otherwise not actuated. In some embodiments, a fixed equalizer may be used instead of the equalizer 306.

In an exemplary embodiment, the variable attenuator 308 receives the communication signal from the equalizer 306. The variable attenuator 308, if actuated by the address switch 206, attenuates the communication signal. In an exemplary embodiment, the address switch 206 actuates the variable attenuator 308 by communicating a control signal to the variable attenuator 308 based on a control signal generated by the processor 202. Additionally, the address switch 206 may specify a level of attenuation that is used by the variable attenuator 308. In some embodiments, the level of attenuation may be predefined and set during installation or initialization of the agile equalizer system 100. For example, a particular one of the equalizer stages 212 may be designated for compensation of a UHF media signal that is received from the antenna 108c. If characteristics of the received UHF media signal are known or determinable, and if a single level of attenuation is desired for the received UHF media signal prior to other compensation, then the variable attenuator 308 may be preset. In some embodiments, the variable attenuator 308 may be omitted, may be bypassed, or otherwise not actuated. In some embodiments, a fixed attenuator may be used instead of the variable attenuator 308.

In an exemplary embodiment, the second variable amp 310 receives a communication signal from the variable attenuator 308. The second variable amp 310, if actuated by the address switch 206, amplifies the communication signal. In an exemplary embodiment, the address switch 206 actuates the second variable amp 310 by communicating a control signal to the second variable amp 310 based on a control signal generated by the processor 202. Additionally, the address switch 206 may specify a level of amplification that is used by the second variable amp 310. In some embodiments, the level of amplification may be predefined and set during installation or initialization of the agile equalizer system 100. For example, a particular one of the equalizer stages 212 may be designated for compensation of a UHF media signal that is received from the antenna 108c. If characteristics of the received UHF media signal are known or determinable, and if a single level of amplification is desired for the received UHF media signal after other compensation, then the second variable amp 310 may be preset. In other embodiments, the level of amplification provided by the second variable amp 310 may be coordinated with amplification provided by the first variable amp 302 and/or may be set based upon the particular destination media device 102. In some embodiments, the second variable amp 310 may be omitted, may be bypassed, or otherwise not actuated. In some embodiments, a fixed amplifier may be used instead of the second variable amp 310.

Some embodiments may include a two-way equalizer stage 312. The two-way equalizer stage 312 is configured to support two-way communications, such as might be used by the MoCA media devices 102. The two-way equalizer stage 312 may include a first two-way variable amp 302a, a forward equalizer 306a, a variable filter 304, a reverse equalizer 306b, a variable attenuator 308, and a second two-way variable amp 310a. The first two-way variable amp 302a and the second two-way variable amp 310a allow bidirectional communications. Amplification in the two directions may be the same or may be different. The forward equalizer 306a provides equalization in the forward direction. The reverse equalizer 306b provides equalization in the reverse direction.

In alternative embodiments, the order of components of an equalizer stage 212 may be changed from the order illustrated in FIG. 3. In other embodiments, additional compensation and/or signal conditioning components may be included in an alternative equalizer stage 212.

The compensation control signal is based on one or more of the received test signals 222 generated by the test signal generator 204. Determining the compensation control signal is generally done prior to communication of a particular communication signal to the active destination media device 102. Alternatively, or additionally, the compensation control signal received from the active destination media device 102 may be dynamically adjusted by the active destination media device 102 to further improve quality of the received compensated communication signal. For example, concurrent communication of one or more other communication signals to other active destination media devices 102 may affect the attenuation characteristics of the coaxial cable communication network 104. Thus, some embodiments of the agile equalizer system 100 are configured to dynamically adjust the compensation control signals provided to the agile equalizer 106.

Figure 4:
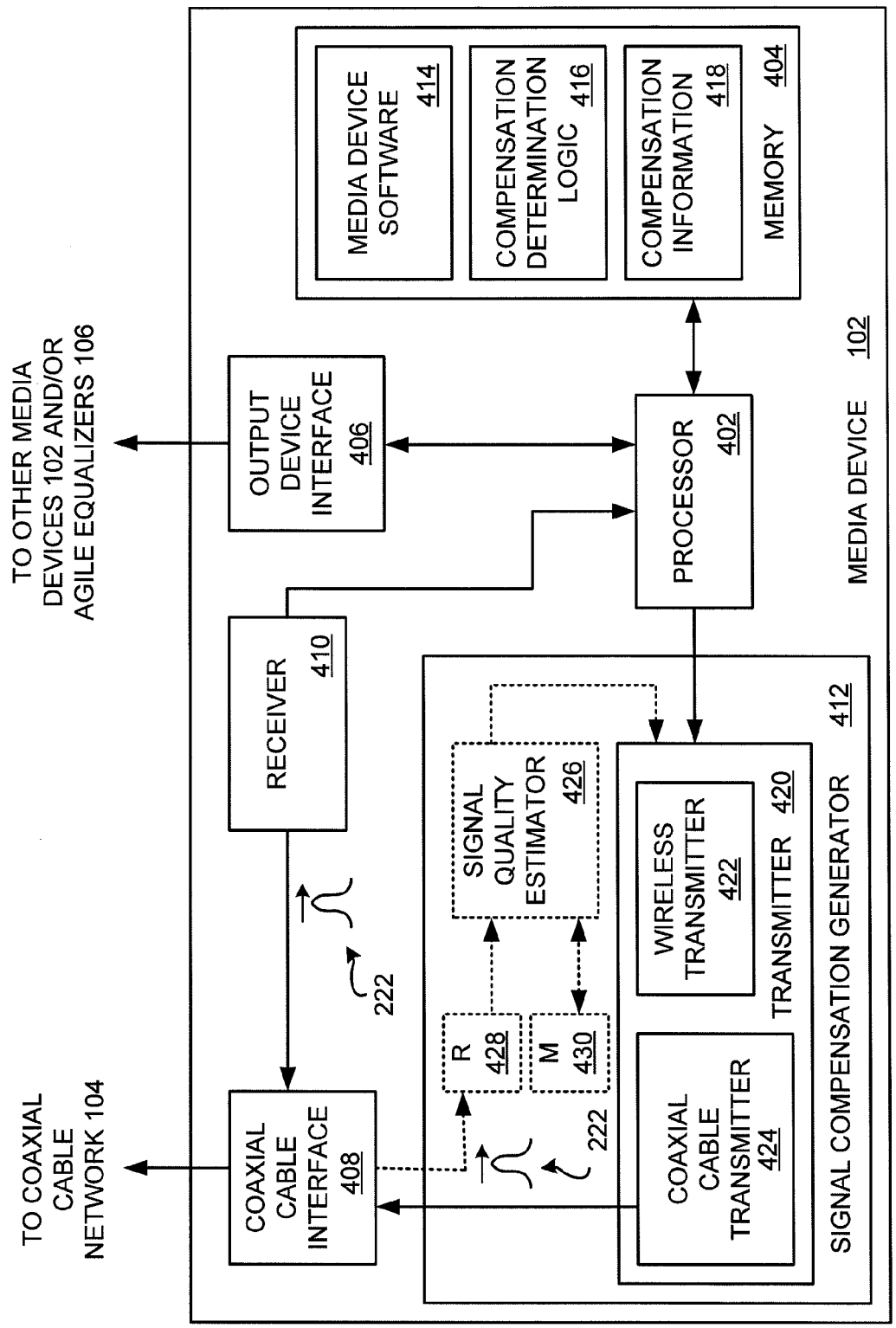
FIG. 4 is a block diagram of an exemplary signal compensation generator implemented in an exemplary media device.

FIG. 4 is a block diagram of an exemplary signal compensation generator 400 implemented in an exemplary media device 102. The exemplary media device 102 comprises a processor 402, a memory 404, an optional output device interface 406, a coaxial cable interface 408, a receiver 410, and the exemplary signal compensation generator 412. The memory 404 is configured to store media device software 414, compensation determination logic 416, and optionally, compensation information 418. The exemplary signal compensation generator 412 comprises a transmitter 420 with at least one of a wireless transmitter 422 and a coaxial cable transmitter 424.

The exemplary media device 102 may be any media device that is configured to couple to the coaxial cable communication network 104, via the coaxial cable interface 408. The processor 402 is configured to perform the intended functionality of the media device 102. The media device software 414 embodies the functionality of the media device 102 and is represented as a single block of software, and is not described herein in detail for brevity. In the various embodiments of the media device 102, other components may reside in the media device 102 (not shown). For example, one or more intermediate components may be disposed between the coaxial cable interface 408 and the processor 402.

The media device 102 may include an optional output device interface 406. For example, with respect to FIG. 1, the output device interface 406 could be implemented in the STB media device 102a to provide for communicatively coupling to the television 102c and/or the agile equalizer 106b. The output device interface 406 may be configured to provide a means for coupling to a coaxial cable, another type of wire-based medium, and/or a wireless medium.

The receiver 410 is configured to receive one or more test signals 222 from at least one agile equalizer 106 that it is communicatively coupled to the coaxial cable communication network 104. Based on the received test signal 222, the processor 402 is configured to retrieve and execute the compensation determination logic 412 to define a compensation control signal. When the compensation control signal has been determined, the processor 402 saves the determined compensation control signal into the compensation information 414 portion of memory 404.

The signal compensation generator 400 includes a transmitter 420 that is configured to communicate the compensation control signal to the agile equalizer 106. In an exemplary embodiment, at a predefined time prior to the media device 102 starting communications over the coaxial cable communication network 104, the compensation control signal is retrieved from the compensation information 418 and is communicated to the transmitter 420 in a suitable format for communication of the agile equalizer 106. Accordingly, the agile equalizer 106 will begin implementing the desired compensation. Alternatively, or additionally, embodiments of the media device 102 may communicate the compensated communication signal to the agile equalizer 106 after the test signal 222 has been processed to determine the compensation.

The transmitter 420 includes the wireless transmitter 422 and/or the coaxial cable transmitter 424. The wireless transmitter 422 is configured to transmit a wireless compensation control signal from the media device 102 to the agile equalizer 106. The wireless compensation control signal may be communicated using any suitable wireless medium, such as, but not limited to, a radio frequency (RF) medium. The coaxial cable transmitter 424 is configured to transmit a wire-based compensation control signal over the coaxial cable communication network 104 from the current destination media device 102 to the agile equalizer 106. Some embodiments may include both the wireless transmitter 422 and/or the coaxial cable transmitter 424, may include multiple transmitters 422 and/or 424, and/or may include other types of transmitters.

In alternative embodiments, the transmitter 422 may be implemented in a multifunction transmitter that is configured to transmit both communication signals and compensation control signals over the coaxial cable communication network 104. For example, with respect to FIG. 1, the computer system 102f (which communicates over a coaxial cable 104e) may be configured to transmit communication signals to other devices using a transmitter (not shown). The same transmitter that transmits the communication signals to other device may also be configured to transmit the compensation control signal to the agile equalizer 106a.

Alternative embodiments of the signal compensation generator 412 may include an optional signal quality estimator 426, an optional receiver (R) 428, and an optional memory (M) 440. In these embodiments, the receiver 428 is configured to receive one or more test signals 222 from one of the agile equalizers 106 via the coaxial cable communication network 104. The signal quality estimator 426 is configured to determine the particular level and/or the type of signal compensation that should be provided by the agile equalizer 106 when it is communicating a communication signal to the media device 102. The determined compensation information may be stored in the memory 430. Thus, the processor 402 would not be determining the compensation control signal in these alternative embodiments.

The optional signal quality estimator 426, the optional receiver (R) 428, and the optional memory (M) 430 may, in some applications, be configured to adapt a legacy media device 102 to become operable with an agile equalizer 106. For example, with respect to FIG. 1, the agile equalizer 106*b* may be communicating data communication signals to the computer system 102*f*. A card or the like with the signal quality estimator 426, the receiver (R) 428, and the memory (M) 430 may be added into the computer system 102*f*. The signal quality estimator 426 determines the compensation control signal defining the particular level and/or the type of signal compensation suitable for the data communication signal communicated from the agile equalizer 106*a* to the computer system 102*f*.

The exemplary embodiment of the media device 102 of FIG. 4 includes the signal compensation generator 412 as an internal component. In alternative embodiments, the signal compensation generator 412 may be an external device or component that is communicatively coupled to the coaxial cable that provides communications to the media device 102. In such embodiments, the signal compensation generator 412 with the transmitter 420, the signal quality estimator 426, the receiver (R) 428, and the memory (M) 430 may be implemented in an enclosure with suitable coaxial cable connectors. The enclosed signal compensation generator 412 may be communicatively coupled to a legacy media device 102 so that signal compensation may be determined for the legacy media device 102.

When media device 102 concludes communications over the coaxial cable communication network 104, the agile equalizer 106 may cease the signal compensation for that particular media device 102. In some embodiments, the media device 102 notifies the agile equalizer 106 by communicating a signal via one of the transmitters 420.

In some applications, there may be a single media device 102 coupled to a single agile equalizer 106 via a single coaxial cable. Here, the coaxial cable communication network 104 is comprised of the single coaxial cable.

In the various embodiments, after the compensation is initially determined based on one or more of the received test signals 222, embodiments continue to monitor received signal quality on a real-time basis and/or a periodic basis. Test signals 222 may be periodically re-communicated for evaluation. Alternatively, or additionally, quality of received signals may be monitored to determine if updated compensation information should be provided to the agile equalizer 106. For example, a storm with heavy precipitation and/or wind may temporarily interfere with signal reception. Accordingly, embodiments monitor signal quality, and then determine updated compensation information in view of the transient storm.

It should be emphasized that the above-described embodiments of the agile equalizer system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for compensating communication signals communicated to a plurality of media devices from an agile equalizer, wherein the media devices are communicatively coupled to the agile equalizer via a coaxial cable communication system, and wherein the agile equalizer comprises at least a first equalizer stage and a second equalizer stage, the method comprising:

receiving a first compensation control signal from a first media device, wherein the first compensation control signal defines compensation for communication signals communicated to the first media device over a first coaxial cable;

compensating a received first communication signal based upon the first compensation control signal, wherein the received first communication signal is compensated by the first equalizer stage that comprises an amplifier configured to amplify the received first communication signal in response to actuation by an address switch, a filter configured to filter the received first communication signal in response to actuation by the address switch, an equalizer configured to equalize the received first communication signal in response to actuation by the address switch, and an attenuator configured to attenuate the received first communication signal in response to actuation by the address switch;

communicating the first compensated communication signal to the first media device over the first coaxial cable;

receiving a second compensation control signal from a second media device, wherein the second compensation control signal defines compensation for communication signals communicated to the second media device over a second coaxial cable;

compensating a received second communication signal based upon the second compensation control signal, wherein the received second communication signal is compensated by the second equalizer stage; and communicating the second compensated communication signal to the second media device over the second coaxial cable.

2. The method of claim 1, wherein receiving the first compensation control signal comprises:

receiving the first compensation control signal using a radio frequency communication media.

3. The method of claim 1, wherein receiving the first compensation control signal comprises:

receiving the first compensation control signal using a coaxial cable communication media.

4. The method of claim 1, wherein receiving the first compensation control signal and receiving the second compensation control signal comprises:

receiving the first compensation control signal using a radio frequency communication media; and receiving the second compensation control signal using a coaxial cable communication media.

5. The method of claim 1, wherein the first compensation control signal is received at the agile equalizer prior to the first media device initiating communication with another device.

6. The method of claim 1, wherein the first compensation control signal is received at the agile equalizer a predefined amount of time before the first media device starts initiating communication with another device.

7. The method of claim 1, wherein the first communication signal is a first type of communication signal, and wherein the second communication signal is a second type of communication signal different from the first type of communication signal.

8. The method of claim 7, wherein the first type of communication signal and the second type of communication signal comprise at least one selected from a group consisting of a very high frequency (VHF) signal, an ultra high frequency (UHF) signal, an L-band signal, and a Multimedia over Coax-Alliance (MoCA) signal.

9. The method of claim 7, wherein the first coaxial cable has a first attenuation characteristic associated with the first type of communication signal, wherein the second coaxial cable has a second attenuation characteristic associated with the second type of communication signal, and wherein the first attenuation characteristic is different from the second attenuation characteristic.

10. The method of claim 1, wherein the first coaxial cable has a first length that defines a first attenuation characteristic, wherein the second coaxial cable has a second length that defines a second attenuation characteristic, and wherein the first length is different from the second length.

11. The method of claim 1, wherein prior to receiving the first compensation control signal and the second compensation control signal, the method further comprising:
communicating a first test signal to the first media device from the agile equalizer, wherein the first media device determines the first compensation control signal based upon the first test signal; and
communicating a second test signal to the second media device from the agile equalizer, wherein the second media device determines the second compensation control signal based upon the second test signal.

12. The method of claim 11, wherein the first test signal is a first type of test signal, wherein the second test signal is a second type of test signal different from the first type of test signal, and wherein the first type of test signal and the second type of test signal comprise at least one selected from a group consisting of a very high frequency (VHF) test signal, an ultra high frequency (UHF) test signal, an L-band test signal, and a Multimedia over Coax-Alliance (MoCA) test signal.

13. An agile equalizer that compensates communication signals communicated to a plurality of media devices, wherein the media devices are communicatively coupled to the agile equalizer via a coaxial cable communication system, comprising:
a receiver configured to:
receive a first compensation control signal from a first media device, wherein the first compensation control signal defines compensation for communication signals communicated from the agile equalizer to the first media device over a first coaxial cable; and
receive a second compensation control signal from a second media device, wherein the second compensation control signal defines compensation for communication signals communicated from the agile equalizer to the second media device over a second coaxial cable;
an address switch communicatively coupled to the receiver;
a first equalizer stage configured to output a first compensated communication signal on to the coaxial cable communication system in response to actuation by the address switch, wherein the first equalizer stage is configured to compensate a received first communication signal into the first compensated communication signal, and wherein the first compensated communication signal is receivable by the first media device, wherein the first equalizer stage comprises:
an amplifier configured to amplify the received first communication signal in response to actuation by the address switch;
a filter configured to filter the received first communication signal in response to actuation by the address switch;
an equalizer configured to equalize the received first communication signal in response to actuation by the address switch; and
an attenuator configured to attenuate the received first communication signal in response to actuation by the address switch;
a second equalizer stage configured to output a second compensated communication signal on to the coaxial cable communication system in response to actuation by the address switch, wherein the second compensated communication signal is receivable by the second media device; and
a processor communicatively coupled to the address switch and the receiver, wherein the processor is configured to communicate a first control signal to the address switch based upon the first compensation control signal, and is further configured to communicate a second control signal to the address switch based upon the second compensation control signal,
wherein the address switch is configured to actuate the first equalizer stage in response to receiving the first control signal, and is further configured to actuate the second equalizer stage in response to receiving the second control signal.

14. The agile equalizer of claim 13,
wherein the first compensation control signal defines compensation for the first communication signal communicated from the agile equalizer to the first media device over the first coaxial cable,
wherein the second compensation control signal defines compensation for a second communication signal communicated from the agile equalizer to the second media device over the second coaxial cable,
wherein the first equalizer stage is configured to compensate a first type of the first communication signal, and
wherein the second equalizer stage is configured to compensate a second type of the second communication signal.

15. The agile equalizer of claim 13, further comprising:
a test signal generator coupled to the coaxial communication system,
wherein the test signal generator is configured to communicate a first test signal to the first media device, wherein the first media device determines the first compensation control signal based upon the first test signal, and
wherein the test signal generator is further configured to communicate a second test signal to the second media device, wherein the second media device determines the second compensation control signal based upon the second test signal.

16. The agile equalizer of claim 13, wherein the amplifier is a first amplifier coupled to a signal source, wherein the signal source communicates the first communication signal to the first amplifier, and wherein the first equalizer stage further comprises:
a second amplifier communicatively coupled to an output of the first amplifier, and configured to further amplify the received first communication signal in response to actuation by the address switch,
wherein the second amplifier further amplifies the received first communication signal after compensation of the received first communication signal by at least one of the filter, the equalizer, and the attenuator.

17. The agile equalizer of claim 13, wherein a first type of the first communication signal is different from a second type of a second communication signal, and wherein the first equalizer stage and the second equalizer stage are configured to compensate at least one type of the first and the second communication signal selected from a group consisting of a very high frequency (VHF) signal, an ultra high frequency (UHF) signal, an L-band signal, and a Multimedia over Coax-Alliance (MoCA) signal.

18. A media device that receives compensated communication signals from an agile equalizer, wherein the media device is coupled to the agile equalizer via a coaxial cable communication system, comprising:
- a coaxial cable interface configured to communicatively couple the media device to a coaxial cable of the coaxial cable communication system, and configured to:
  - receive a first test signal from the agile equalizer, and
  - receive the compensated communication signals from the agile equalizer;
- a signal quality estimator communicatively coupled to the coaxial cable interface, and configured to determine a compensation control signal based upon the received first test signal;
- a memory communicatively coupled to the signal quality estimator, and configured to store information corresponding to the compensation control signal; and
- a transmitter configured to transmit the compensation control signal to the agile equalizer, wherein the compensation control signal is transmitted to the agile equalizer a predefined amount of time before the first media device starts communicating, wherein the agile equalizer has a plurality of equalizer stages that each comprise:
- an amplifier configured to amplify a received communication signal in response to actuation by an address switch;
- a filter configured to filter the received communication signal in response to actuation by the address switch;
- an equalizer configured to equalize the received communication signal in response to actuation by the address switch; and
- an attenuator configured to attenuate the received communication signal in response to actuation by the address switch, wherein one of the plurality of equalizer stages of the agile equalizer compensates the received communication signal to generate a compensated communication signal in accordance with the transmitted compensation control signal, and wherein the compensated communication signal is received at the media device over the coaxial cable.

19. The media device of claim 18, wherein the transmitter is a radio frequency transmitter, and wherein the compensation control signal is communicated to the agile equalizer using a radio frequency communication media.

* * * * *